US006981260B2

(12) United States Patent
Brenner et al.

(10) Patent No.: US 6,981,260 B2
(45) Date of Patent: Dec. 27, 2005

(54) APPARATUS FOR MINIMIZING LOCK CONTENTION IN A MULTIPLE PROCESSOR SYSTEM WITH MULTIPLE RUN QUEUES WHEN DETERMINING THE THREADS PRIORITIES

(75) Inventors: Larry Bert Brenner, Austin, TX (US); Luke Mathew Browning, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 10/455,108

(22) Filed: Jun. 5, 2003

(65) Prior Publication Data

US 2003/0195920 A1  Oct. 16, 2003

Related U.S. Application Data

(62) Division of application No. 09/578,744, filed on May 25, 2000, now abandoned.

(51) Int. Cl.[7] .............................................. G06F 9/46
(52) U.S. Cl. ........................ 718/103; 718/100; 718/102
(58) Field of Search ............................. 718/100, 102, 718/103, 104, 107, 105

(56) References Cited

U.S. PATENT DOCUMENTS

| | | | |
|---|---|---|---|
| 5,193,172 A * | 3/1993 | Arai et al. ................... | 718/104 |
| 5,261,053 A * | 11/1993 | Valencia ...................... | 711/133 |
| 5,274,809 A | 12/1993 | Iwasaki et al. .............. | 395/650 |
| 5,506,987 A * | 4/1996 | Abramson et al. .......... | 718/103 |
| 5,734,909 A | 3/1998 | Bennett ....................... | 395/726 |
| 5,745,778 A * | 4/1998 | Alfieri .......................... | 712/1 |
| 5,784,614 A | 7/1998 | Davis ........................... | 395/672 |
| 5,826,081 A * | 10/1998 | Zolnowsky ................. | 718/103 |
| 5,872,972 A * | 2/1999 | Boland et al. ............... | 718/102 |
| 5,928,322 A * | 7/1999 | Bitar et al. .................. | 718/103 |
| 5,956,712 A | 9/1999 | Bennett et al. ................ | 707/8 |
| 6,006,247 A | 12/1999 | Browning et al. ........... | 709/102 |
| 6,065,046 A * | 5/2000 | Feinberg et al. ............. | 709/216 |
| 6,088,511 A * | 7/2000 | Hardwick .................... | 717/149 |
| 6,105,053 A * | 8/2000 | Kimmel et al. .............. | 718/105 |

(Continued)

OTHER PUBLICATIONS

TechEncyclopedia Multithreading; www.techweb.com; pp. 1-2.

*Primary Examiner*—Meng-Al T. An
*Assistant Examiner*—Lilian Vo
(74) *Attorney, Agent, or Firm*—Duke W. Yee; Mark S. Walker; Francis Lammes

(57) ABSTRACT

Apparatus and methods are provided for selecting a thread to dispatch in a multiple processor system having a global run queue associated with each multiple processor node and having a local run queue associated with each processor. If the global run queue and the local run queue associated with the processor performing the dispatch are both not empty, then the highest priority queue is selected for dispatch, as determined by examining the queues without obtaining a lock. If one of the two queues is empty and the other queue is not empty, then the non-empty queue is selected for dispatch. If the global queue is selected for dispatch but a lock on the global queue cannot be obtained immediately, then the local queue is selected for dispatch. If both queues are empty, then an idle load balancing operation is performed. Local run queues for other processors at the same node are examining without obtaining a lock. If a candidate thread is found that satisfies a set of shift conditions, and if a lock can be obtained on both the non-local run queue and the candidate thread, then the thread is shifted for dispatch by the processor that is about to become idle.

34 Claims, 7 Drawing Sheets

U.S. PATENT DOCUMENTS

| | | | |
|---|---|---|---|
| 6,128,657 A * | 10/2000 | Okanoya et al. | 709/224 |
| 6,148,324 A * | 11/2000 | Ransom et al. | 718/105 |
| 6,223,205 B1 * | 4/2001 | Harchol-Balter et al. | 718/105 |
| 6,314,501 B1 | 11/2001 | Gulick et al. | 711/153 |
| 6,338,063 B1 | 1/2002 | Barr | 707/8 |
| 6,418,517 B1 | 7/2002 | McKenney et al. | 711/151 |
| 6,442,139 B1 * | 8/2002 | Hosein | 370/236 |
| 6,578,033 B1 | 6/2003 | Singhal et al. | 707/8 |
| 6,625,161 B1 * | 9/2003 | Su et al. | 370/415 |
| 6,633,897 B1 | 10/2003 | Browning et al. | 709/103 |
| 6,728,959 B1 * | 4/2004 | Merkey | 718/102 |
| 6,804,711 B1 * | 10/2004 | Dugan et al. | 709/223 |
| 2002/0034951 A1 * | 3/2002 | Salonaho et al. | 455/453 |
| 2003/0037178 A1 | 2/2003 | Vessey et al. | 709/319 |
| 2003/0110203 A1 | 6/2003 | Brenner et al. | 709/103 |
| 2003/0120811 A1 | 6/2003 | Hanson et al. | 709/245 |

* cited by examiner

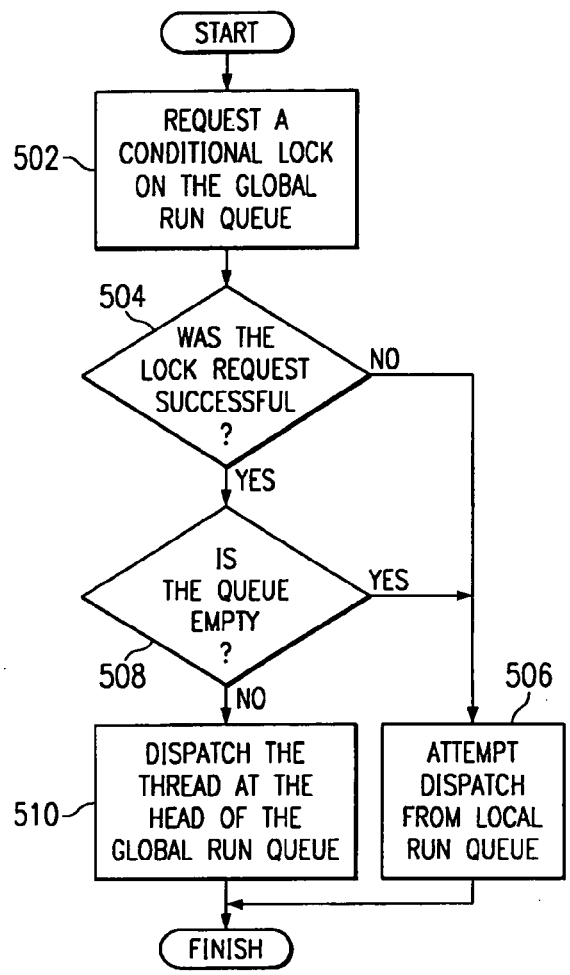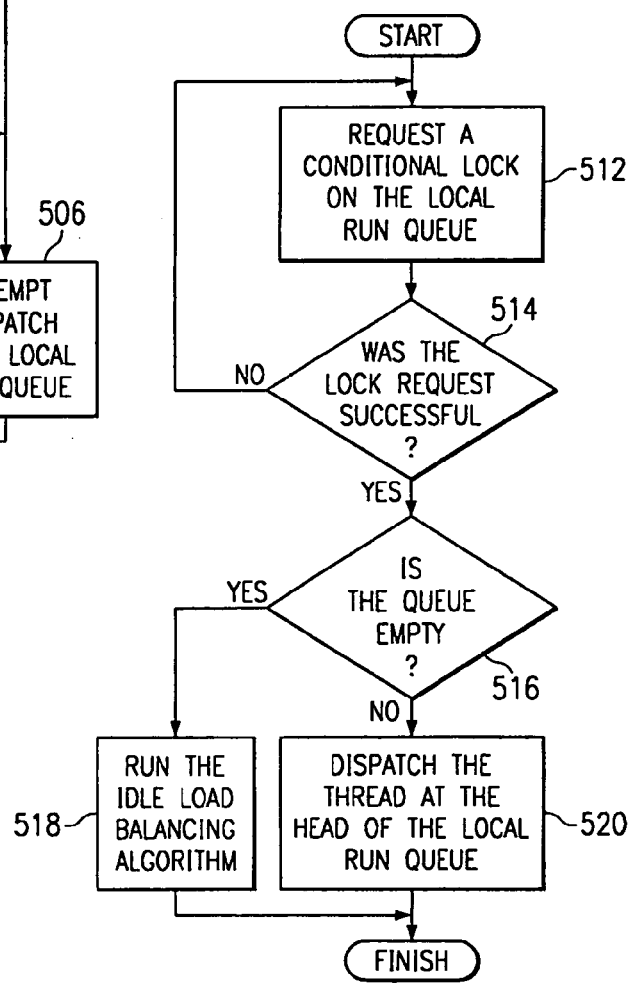

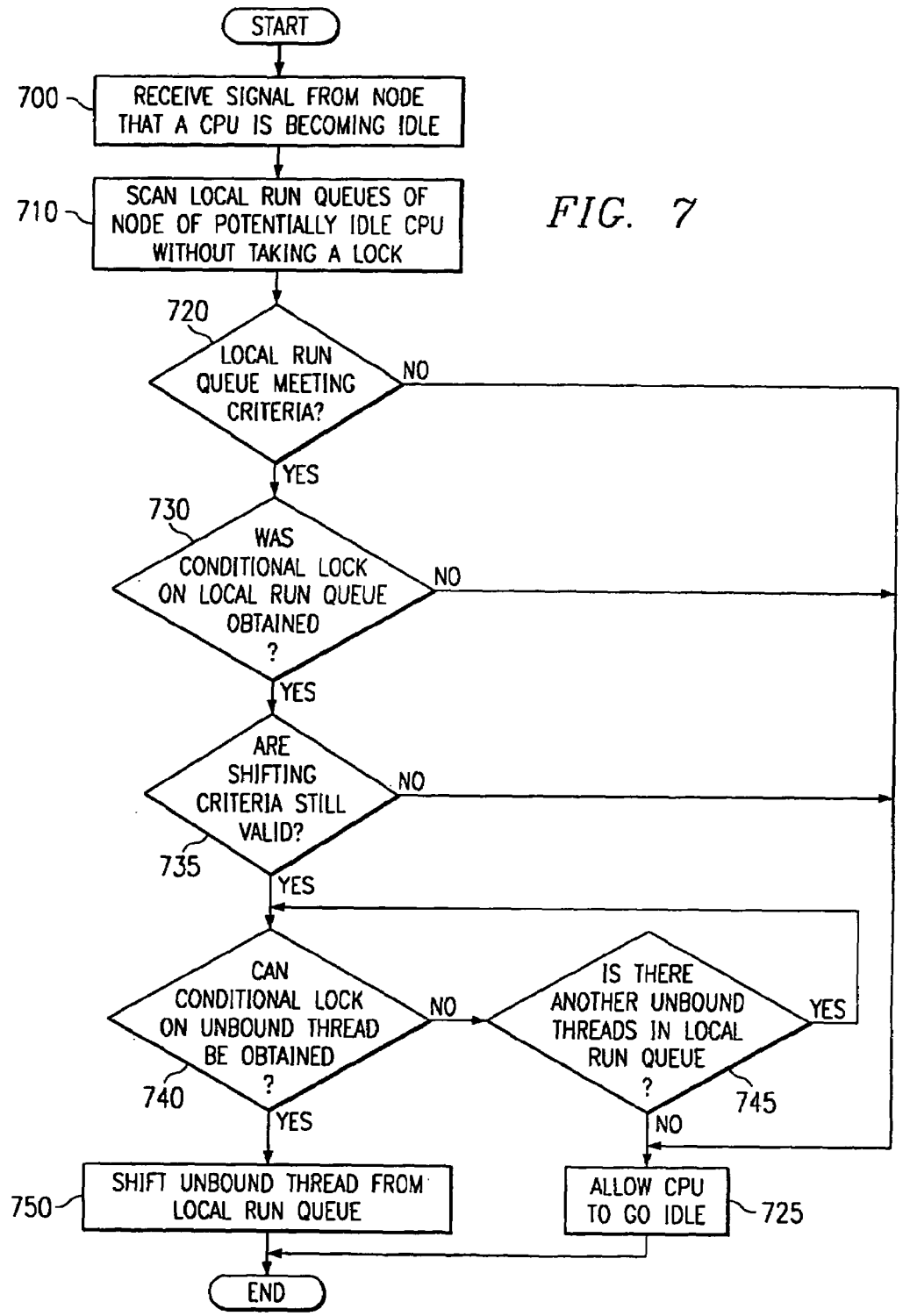

APPARATUS FOR MINIMIZING LOCK CONTENTION IN A MULTIPLE PROCESSOR SYSTEM WITH MULTIPLE RUN QUEUES WHEN DETERMINING THE THREADS PRIORITIES

CROSS-REFERENCE TO RELATED APPLICATIONS

The present invention is related to the following applications entitled "Apparatus and Method for Dispatching Fixed Priority Threads Using a Global Run Queue in a Multiple Run Queue System", U.S. application Ser. No. 09/506,230, filed on Feb. 17, 2000; "Apparatus and Method for Starvation Load Balancing Using a Global Run Queue in a Multiple Run Queue System", U.S. application Ser. No. 09/506,856, and "Apparatus and Method for Periodic Load Balancing in a Multiple Run Queue System", U.S. application Ser. No. 09/506,231, filed Feb. 17, 2000; which are hereby incorporated herein by reference in their entirety.

This application is a divisional of application Ser. No. 09/578,744, filed May 25, 2000 now abandoned, status pending.

BACKGROUND OF THE INVENTION

1. Technical Field

The invention is directed to apparatus and methods for minimizing lock contention in a multiple run queue system.

2. Description of Related Art

Multiple processor systems are generally known in the art. In a multiple processor system, a process may be shared by a plurality of processors. The process is broken up into threads which may be executed concurrently. However, the threads must be queued for each of the processors of the multiple processor system before they may be executed by a processor.

One known technique for queuing threads to be dispatched by a processor in a multiple processor system is to maintain a single centralized queue, or "run queue." As processors become available, they take the next thread in the queue and process it. The drawback to this approach is that the centralized queue becomes a bottleneck for the threads and processing time may be lost due to processors spinning on a run queue lock, i.e. becoming effectively idle, while waiting to take the next thread from the centralized queue.

Another known technique for queuing threads is to maintain separate queues for each processor. Thus, when a thread is created, it is assigned to a processor in some fashion. With such a technique, some processors may become overloaded while other processors are relatively idle. Furthermore, some low priority threads may become starved, i.e. are not provided with any processing time, because higher priority threads are added to the run queue of the processor for which the low priority threads are waiting.

U.S. patent application Ser. Nos. 09/506,230, 09/506,856, and 09/506,231 describe an apparatus that performs initial load balancing, idle load balancing, periodic load balancing and starvation load balancing to ensure that the workloads for the processors of the system are reasonably balanced. These prior apparatus use both per-processor run queues, called local run queues, and run queues served by multiple processors, called global run queues, to manage their threads. Initial load balancing deals with the assignment of a new thread to a global run queue or to one of the local run queues. Idle load balancing addresses how to shift threads from one local run queue to another when a processor is becoming idle. Periodic load balancing addresses how to shift threads from the heaviest loaded local run queue to the lightest loaded local run queue in order to maintain a load balance. Starvation load balancing addresses how to requeue threads that are being starved of processing time.

Using these load balancing schemes, there are two potential areas for excessive lock contention. One area is at the "front end" of the dispatcher, where the choice must be made either to dispatch a thread from a global run queue or to dispatch a thread from a processor's local run queue. The other area of lock contention is at the "back end" of the dispatcher, where neither the global nor local queues have work to be dispatched and lock contention is generated when idle load balancing tries to shift work between local run queues of the processors.

Thus, there is a need for new technology to provide apparatus and methods for minimizing lock contention in a multiple processor system.

SUMMARY OF THE INVENTION

The present invention provides apparatus and methods for selecting a thread to dispatch in a multiple processor system having a global run queue associated with each multiple processor node and having a local run queue associated with each processor. If the global run queue and the local run queue associated with the processor performing the dispatch are both not empty, then the highest priority queue is selected for dispatch, as determined by examining the queues without obtaining a lock. If one of the two queues is empty and the other queue is not empty, then the non-empty queue is selected for dispatch. If the global queue is selected for dispatch but a lock on the global queue cannot be obtained immediately, then the local queue is selected for dispatch.

If both queues are empty, then an idle load balancing operation is performed. Local run queues for other processors at the same node are examined without obtaining a lock. If a candidate thread is found that satisfies a set of shift conditions, and if a lock can be obtained on both the non-local run queue and the candidate thread, then the thread is shifted for dispatch by the processor that is about to become idle.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5A is a flowchart outlining an exemplary operation of attempting to dispatch a thread from a global run queue in accordance with a preferred embodiment of the invention;

FIG. 5B is a flowchart outlining an exemplary operation of attempting to dispatch a thread from a local run queue in accordance with a preferred embodiment of the invention;

FIG. 7 is a flowchart outlining an exemplary operation of the dispatcher when performing idle load balancing in accordance with a preferred embodiment of the invention.

DETAILED DESCRIPTION OF THE PREFERRED EMBODIMENT

Figure 1:
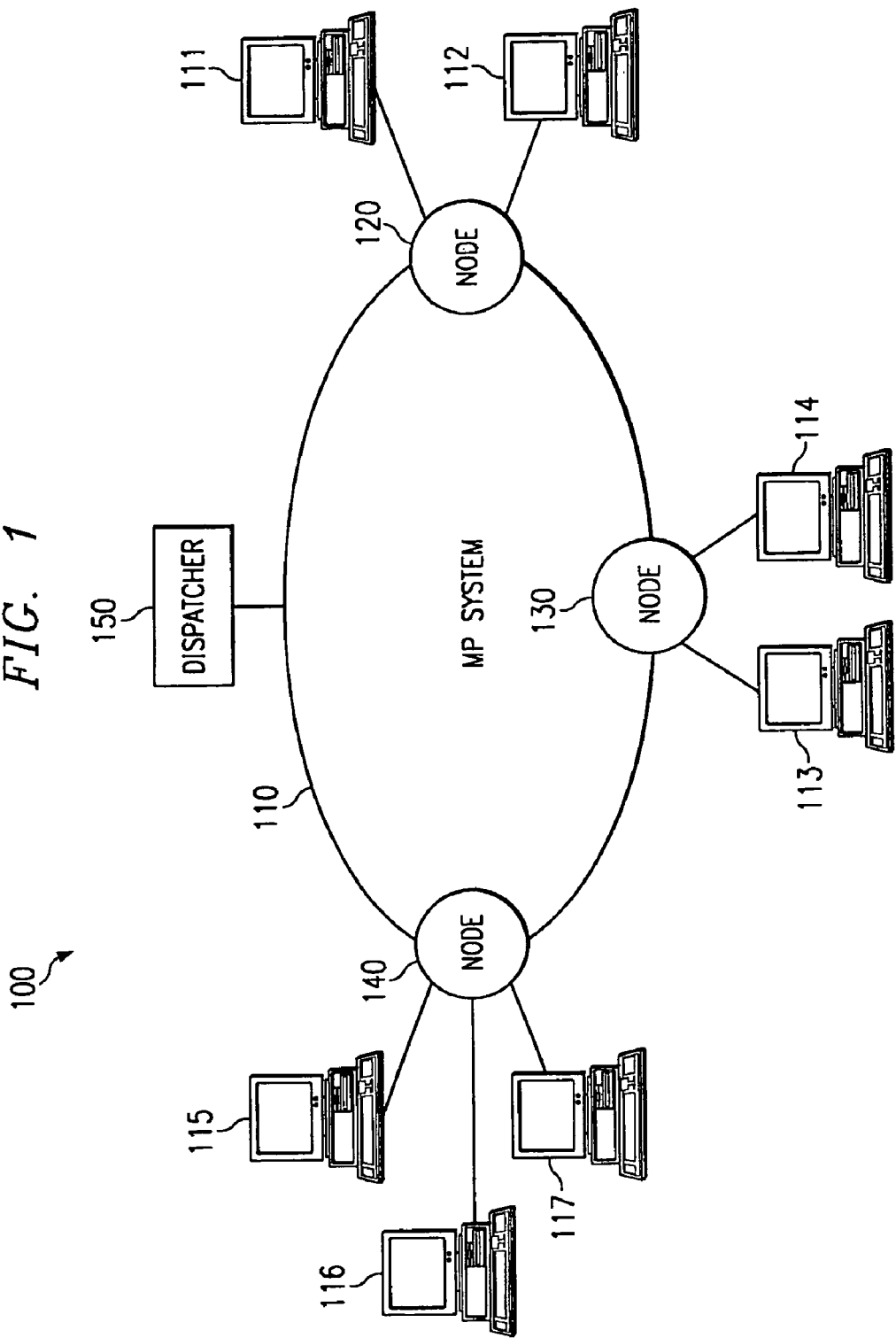
FIG. 1 is an exemplary block diagram of a multiple run queue system in which the present invention may be implemented.

FIG. 1 is an exemplary diagram of a multiple run queue system 100 in which the present invention may be implemented. As shown in FIG. 1, the system 100 includes a multiple processor (MP) system 110, a plurality of CPUs 111–117 organized into nodes 120–140, and a dispatcher 150.

The MP system 110 may be any type of system having a plurality of processors, such as CPUs 111–117. The CPUs 111–117 are any type of processing device capable of processing assigned data processing jobs. The CPUs 111–117 are organized into nodes 120–140. The nodes 120–140 may not be actual devices in themselves, but may be considered representations of the partitioning of CPUs 111–117 into groups. Thus, for example, CPUs 111 and 112 are contained in node 120, CPUs 113 and 114 are contained in node 130, and CPUs 115–117 are contained in node 140.

The dispatcher 150 performs load balancing of the jobs among the nodes 120–140 and the CPUs 111–117. Although the dispatcher 150 is shown as a single centralized device; the dispatcher 150 may be distributed throughout the MP system 110. For example, the dispatcher 150 may be distributed such that a separate dispatcher 150 may be associated with each node 120–140 or a group of nodes 120–140. Furthermore, the dispatcher 150 may be implemented as software instructions run on each CPU 111–117 of the MP system 110.

Each CPU 111–117 has an associated local run queue and each node 120–140 has an associated global run queue. Thus, each CPU 111–117 services a single local run queue and each CPU 111–117 in a node 120–140 services the global run queue for that node. For example, CPUs 111 and 112 both service the global run queue associated with the node 120.

Although in the preferred embodiment there is a one-to-one correspondence between CPUs 111–117 and local run queues, the invention is not limited to such an embodiment. Rather, the local run queues may be shared by more than one CPU in the node. Thus, for example, CPUs 115 and 116 may share a single local run queue while CPU 117 utilizes a second local run queue.

The global and local run queues are populated by threads. A thread is an individual transaction in a multithreaded environment. An environment is a multithreaded environment if the environment permits multitasking within a single program. Multithreading allows multiple streams of execution to take place concurrently within the same program, each stream processing a different transaction or message.

The global run queue of a node competes with the corresponding local run queues for CPUs to service its threads. Threads that are present in the global run queue and threads in the local run queues seek processing time from the CPUs and thus, compete on a priority basis for the CPUs' resources.

The threads in a run queue (local and global) have priorities associated with them. The run queue structure maintains the priority information of the highest priority thread contained in the run queue at the "head" of the run queue. The dispatcher 150 uses this priority information to make decisions of which run queue to search for the next thread to dispatch.

When a run queue (local or global) is selected for dispatch of a thread, the dispatcher 150 attempts to lock the run queue. The terms "locking" a run queue or acquiring a "run queue's lock" refer to the dispatcher 150 restricting access to the run queue in order to avoid alterations of the run queue while the dispatcher 150 attempts to dispatch a thread.

If an attempt to lock a global run queue is unsuccessful, e.g. another CPU has locked that global run queue, the dispatcher 150 does not retry the attempt to lock the global run queue, but instead selects its local run queue, locks it, and attempts to dispatch a thread from it. Retrying a lock attempt on a run queue is referred to as "spinning" on the run queue.

If a lock on the global run queue is successful but there is no thread in the global run queue once the lock has been obtained, then dispatcher 150 attempts to dispatch a thread from the local run queue. If the lock on the global run queue is successful but the only thread in the global run queue is a thread with a different priority than expected, then the dispatcher 150 dispatches the thread anyway.

Threads are added to the global run queues based on load balancing among the nodes 120–140 and the CPUs 111–117. The load balancing may be performed by the dispatcher 150. Load balancing includes a number of methods for keeping the various run queues of the multiple run queue system 100 equally utilized. Load balancing, in accordance with prior U.S. patent application Ser. Nos. 09/506,230 09/506,856, 09/506,231, and this application, may be viewed as four parts: initial load balancing, idle load balancing, periodic load balancing, and starvation load balancing. Lock contention is particularly critical under two conditions: deciding whether to run a thread from a global run queue or a local run queue, and trying to shift a thread from one local run queue to another at the same node when no threads are available from either the node's global run queue or the processor's local run queue.

Figure 2:
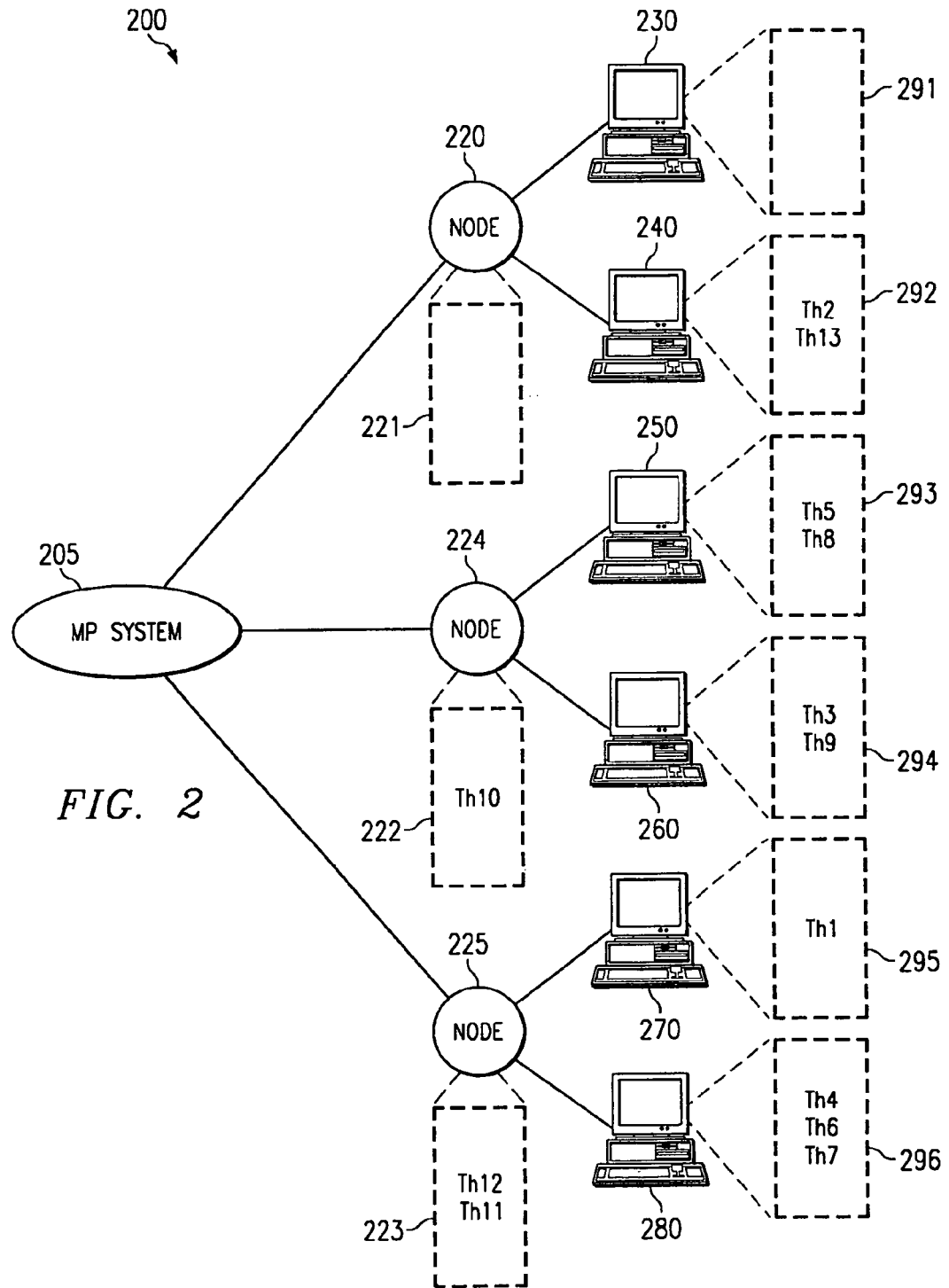
FIG. 2 is an exemplary diagram of a multiple run queue system illustrating lock contention.

The two conditions where lock contention is most critical can best be understood by examining the multiple processor system 200 shown in FIG. 2. MP System 205 contains three nodes: node 220 with its global run queue 221, node 224 with its global run queue 222, and node 225 with its global run queue 223. Node 220 has two CPUs: CPU 230 with its local run queue 291 and CPU 240 with its local run queue 292. Node 224 has two CPUs: CPU 250 with its local run queue 293 and CPU 260 with its local run queue 294. Node 225 has two CPUs: CPU 270 with its local run queue 295 and CPU 280 with its local run queue 296.

In determining which job to dispatch next, CPU 250 needs to compare the priorities of thread Th10 at the head of global run queue 222 and thread Th5 at the head of local run queue 293. In a similar manner, CPU 260 needs to compare the priorities of thread Th10 at the head of global run queue 222 and thread Th3 at the head of local run queue 294. Both CPUs need to examine the priority of the thread at the head of global run queue 222, which results in CPUs 250 and 260 contending for the global run queue lock. As one of ordinary skill in the art will appreciate, if node 224 managed four, eight, or even more CPUs, contention for the lock to global run queue 222 would become a major bottleneck.

Lock contention can also occur for local run queues. For example, if CPU 230 is about to become idle because there are no threads to dispatch in global run queue 221 or local run queue 291, the idle load balancing method, described in U.S. patent application Ser. No. 09/506,230, searches for a thread that might be "stolen" or "shifted" from a local run queue of a neighboring CPU in the same node. Lock contention on local run queue 292 occurs because CPU 240 may be checking the priority of thread Th2 at the head of the queue while, at the same time, CPU 230 is trying to examine queue 292 to see if there is a candidate thread that can be shifted. Details of the criteria for shifting a thread from a local run queue at the same node are provided below.

Both operations require obtaining the lock for local run queue 292, and, hence, one of the CPUs may spin on the lock waiting for the other CPU to release the lock. If node 220 is managing four, eight or more CPUs and several of them are becoming idle, then lock contention for the local run queues for each CPU can become a major problem. Spinning on a lock causes a processor to waste valuable processing time that could be used to dispatch other threads in the system. As one of ordinary skill in the art will appreciate, the shifting of a thread from a local run queue of a CPU in the same node could be extended to consider all local run queues in the MP system.

General Strategy

The general strategy implemented in this invention is to never spin on the lock for a "foreign" queue, as this time is better spent by dispatching threads from the local run queue. A "foreign" queue is either the global run queue or a local run queue belonging to another CPU.

To obtain a lock "conditionally" means that if the lock is not immediately available, then any attempt to obtain the lock is abandoned. In particular, only conditional locks are attempted on foreign queues. To change a thread's assigned run queue requires obtaining the thread lock as well as the run queue lock. If a thread is selected to "shift" for load balancing purposes, but the lock for the thread cannot be immediately obtained, then the attempt to shift the thread is abandoned. This strategy avoids spinning either to obtain a run queue lock on a foreign run queue or to obtain a thread lock for a thread on a foreign queue.

An important aspect of this invention is to examine the priority of a thread at the head of a queue without placing a lock on the queue. Certain information about the queue structure, such as the priority of the item at the head of the queue or the number of items in the queue, is maintained globally in the queue structure and can be obtained without examining individual items in the queue. This information can be accessed even when another process has a lock on the queue. This is an "unsafe" check, in the sense that when a run queue has been locked by another processor, the structure of the run queue may be in the process of changing, such as removing the current head of the run queue. This may result in an "incorrect" decision, as detailed below.

When a processor that has a lock on the run queue finishes its modifications to the run queue structure, it updates the global values maintained as a global part of the queue structure. For instance, if a process with a lock on the run queue has just removed the thread at the head of the run queue, then it would decrement the count of items in the run queue by one and would set the priority of the queue to be the priority of the thread that has just been promoted to the head of the run queue. Another process that has examined these values without a lock may have read values that are incorrect by the time the lock on the run queue is released. This is why reading global values without a lock is referred to as "unsafe."

Choosing Between Threads on the Global and Local Queues

Figure 6:
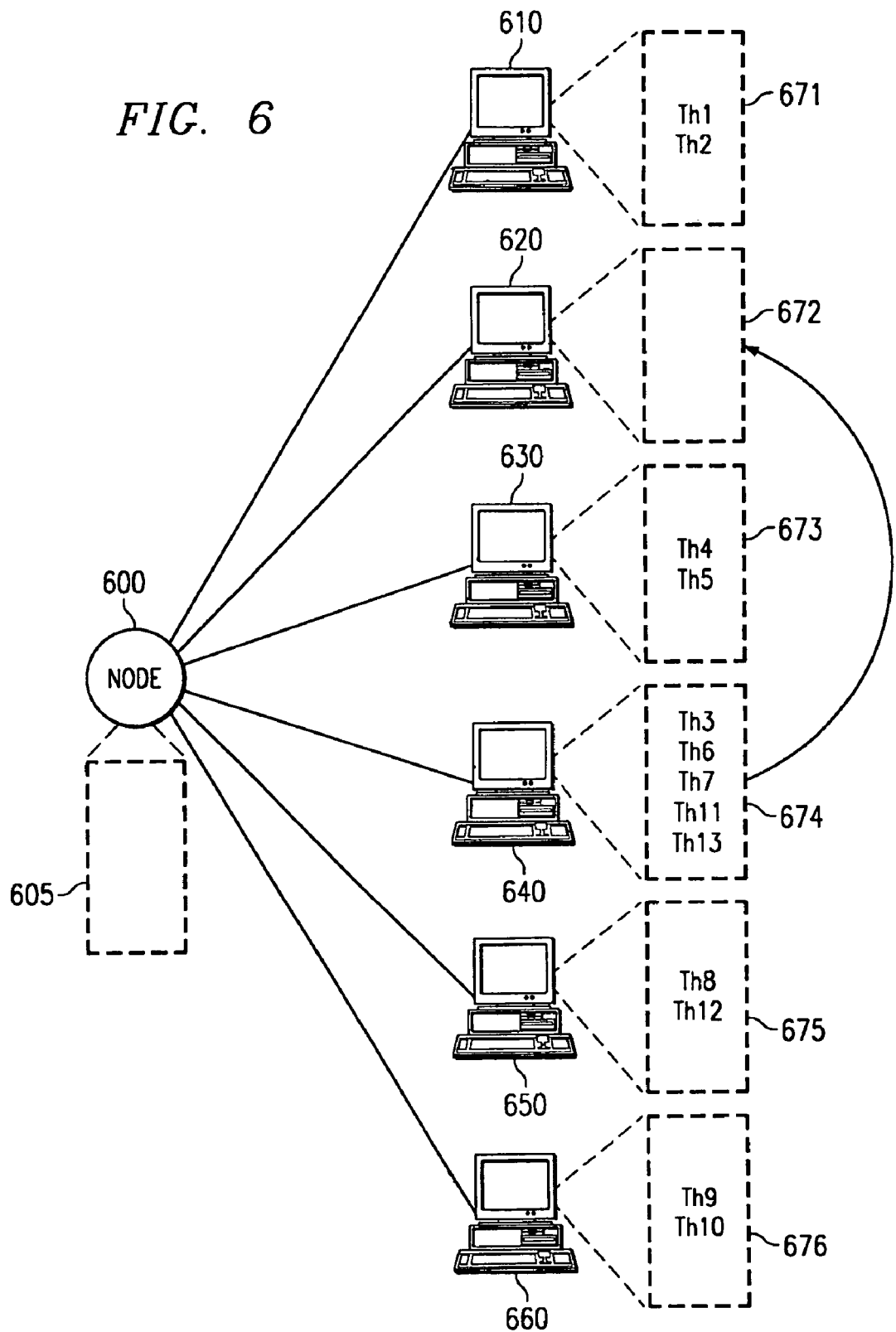
FIG. 6 is an exemplary diagram of a node illustrating an idle load balancing method in accordance with a preferred embodiment of the invention.

The choice between dispatching a thread from a global run queue or from a local run queue is based on relative priorities of the waiting threads, if, in fact, there are threads waiting in both queues. If one queue is empty and the other is not empty, then the thread at the head of the non-empty queue is selected for dispatch, providing the appropriate locks can be obtained. If both queues are empty, then an idle load balancing method, such as that described below in FIGS. 6–7, is executed.

Threads placed on the global run queue can be serviced by any of the CPUs of the node to which the global run queue is assigned. Since these CPUs are continually checking the global queue for possible work, there is a high potential for contention for the global queue's lock. This can become a bottleneck to system performance.

For example, suppose that the global run queue is locked and a first CPU waits until the lock becomes available so that it can examine the queue. The global run queue may have been locked because a second CPU is dispatching a thread from this queue. It is entirely possible that the second CPU is dispatching the only thread in the queue. When the second CPU finally releases the lock and the first CPU obtains the lock, the first CPU finds that there are no threads in the queue. The first CPU has been waiting for a lock on a now empty queue rather than performing other useful work, such as dispatching a thread from its local run queue or performing load balancing. An alternative to this situation is that after the second CPU has dispatched its thread, the next thread in the global run queue has lower priority than the thread at the head of the first CPU's local run queue, which means the thread from the local run queue will be dispatched and the time waiting for the lock on the global run queue has been wasted.

Figure 3:
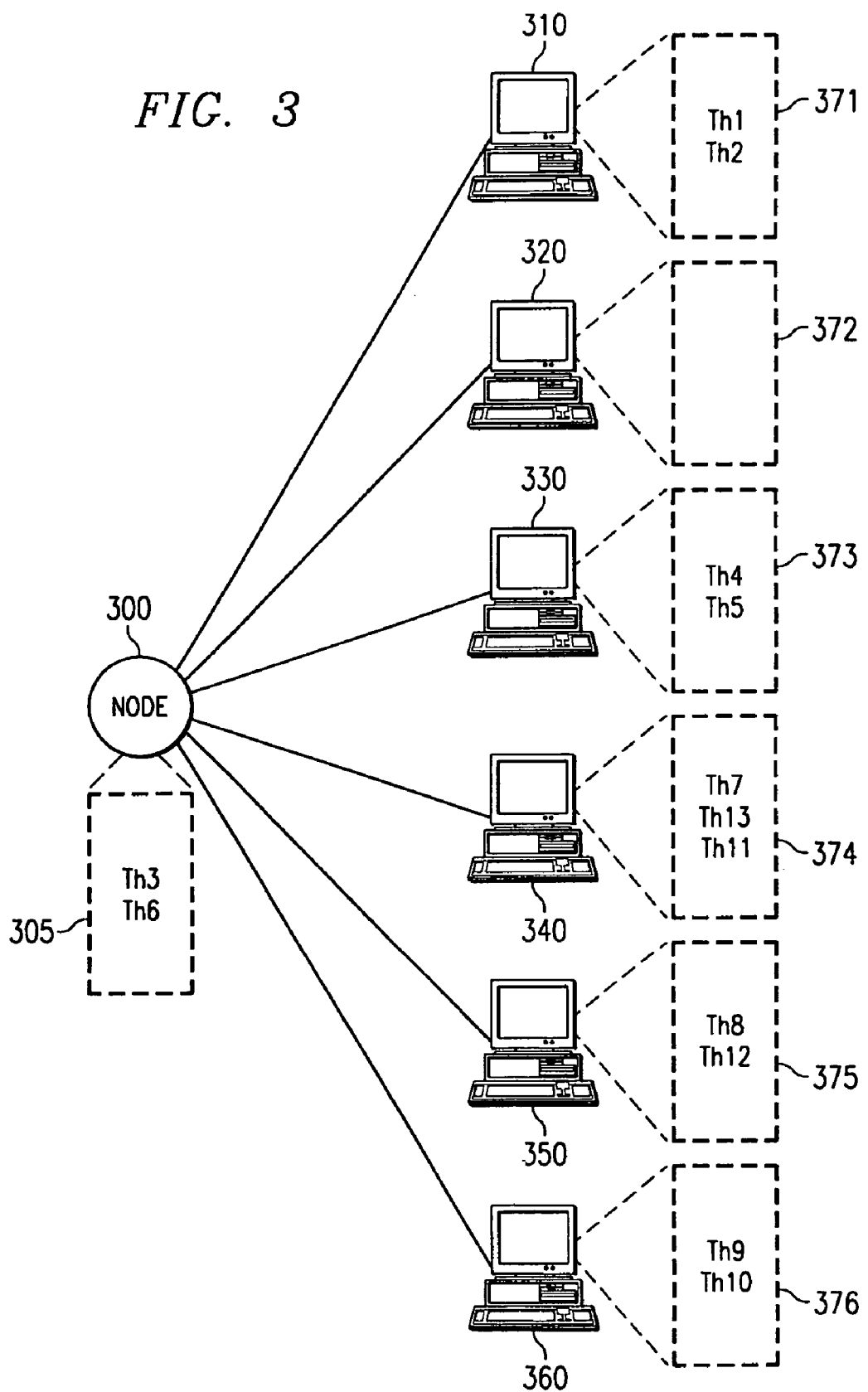
FIG. 3 is an exemplary diagram of a multiple run queue system illustrating selection of a thread to be dispatched in accordance with a preferred embodiment of the invention.

With the present invention, an initial choice between dispatching a thread from the global run queue or the local run queue is made without locking either queue. This means it is possible that an "incorrect" choice, as shown in FIG. 3, may be made. As shown in FIG. 3, node 300 manages global run queue 305. CPUs 310, 320, 330, 340, 350, and 360 have associated local run queues 371, 372, 373, 374, 375, and 376, respectively. CPU 310 is selecting between dispatching the thread Th3 at the head of global run queue 305 or the thread Th1 at the head of its local run queue 371.

In this scenario, thread Th3 in global run queue 305 is assumed to have high priority, thread Th6 in global run queue 305 is assumed to have low priority, and thread Th1 in local run queue, 371 is assumed to have medium priority. CPU 310 compares the priorities of thread Th3 and thread Th6 without obtaining a lock, which means some other CPU may also be examining or dispatching threads in global run queue 305. In particular, suppose CPU 320 is in the process of dispatching thread Th3 from global run queue 305. CPU 310 compares the high priority of thread Th3 with the medium priority of thread Th1 and decides to dispatch thread Th3 from global run queue 305.

After the lock to global run queue 305 is obtained for dispatching, thread Th3 is no longer in the queue because it has already been dispatched by CPU 320 and thread Th6 is now at the head of the queue. Even though thread Th6 does not have the expected priority, it is dispatched. This is an "incorrect" decision, in the sense that if CPU 310 had waited for the lock on global run queue 305 before making the decision, then it would have compared the low priority of thread Th6 with the medium priority of thread Th1 and would have "correctly" dispatched thread Th1.

The importance of "conditional" locking is evident from the scenario illustrated in FIG. 3. If the lock to global queue 305 was not immediately obtained by CPU 310, possibly because CPU 320 is still in the process of dispatching thread Th3, then CPU 310 does not spin waiting for the lock on global run queue 305, rather it proceeds to dispatch thread Th1 from local run queue 371. In general, if another CPU has a lock on the global run queue, then it is probably dispatching a thread. This means that the conditions for making the selection of the thread to be dispatched from either the global run queue or the local run queue are changing and the decision may no longer be valid. In fact, the longer a CPU waits for a lock on a "foreign" queue, the less likely the decision made for dispatching a thread would be correct due to the changing conditions within the "foreign" queue.

Figure 4:
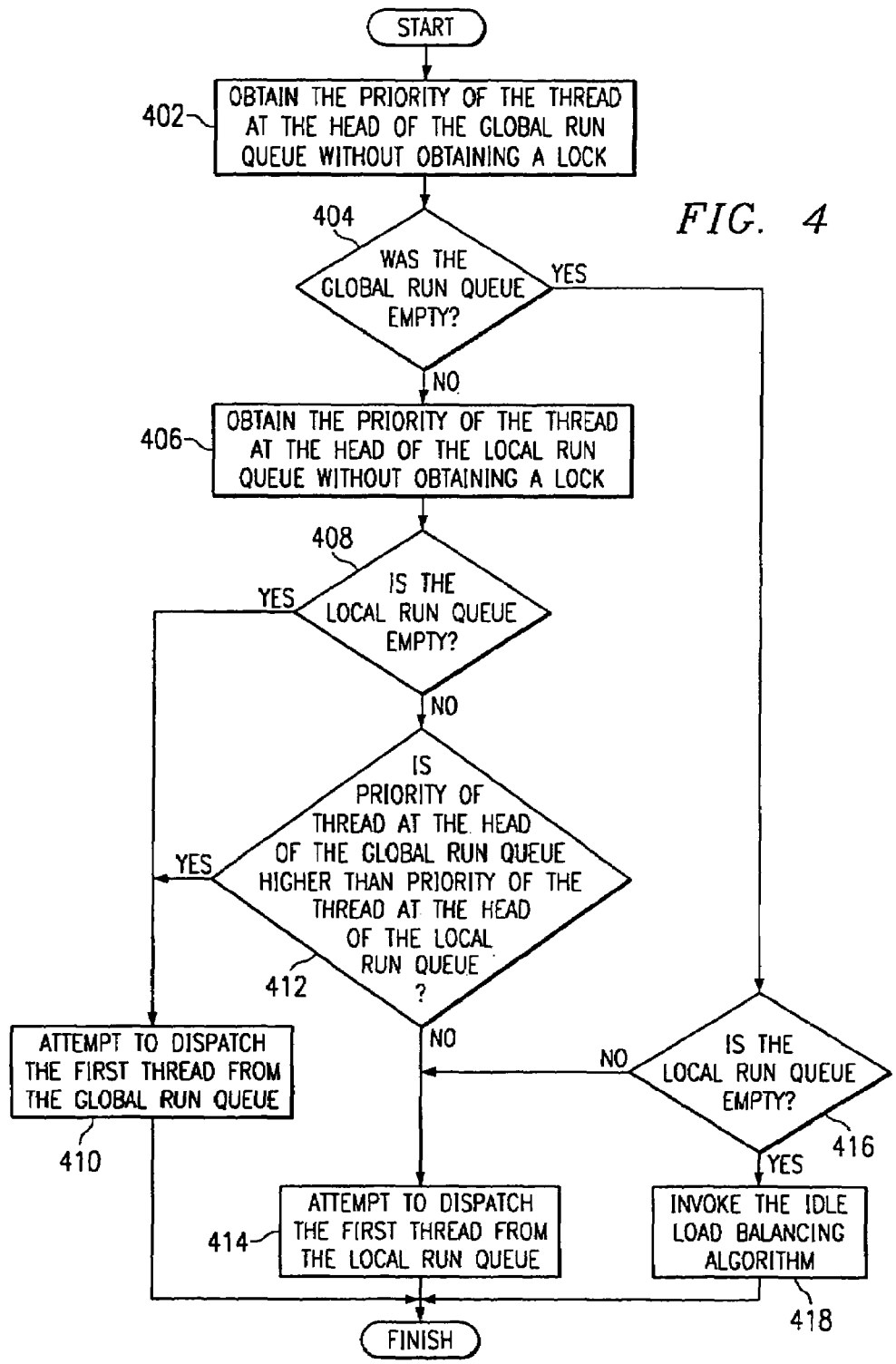
FIG. 4 is a flowchart outlining an exemplary operation of the dispatcher when selecting the next thread to be dispatched in accordance with a preferred embodiment of the invention.

With reference now to FIG. 4, a flowchart outlines an exemplary operation of the dispatcher when selecting the next thread to be dispatched for a particular CPU. The priorities of the threads at the head of the global run queue and the local run queue are compared and the run queue with the highest priority thread is selected for dispatch. The thread dispatch may not succeed, as it is possible for both of the queues to be empty.

The priority of the thread at the head of the global run queue is determined without obtaining a lock (step 402). If the global run queue is not empty (step 404: NO), then the priority of the thread at the head of the local run queue is determined without obtaining a lock (step 406). If the local run queue is empty (step 408: YES), then the global run queue is selected for dispatch (step 410). Details of attempting to dispatch a thread from the global run queue are given in FIG. 5A below.

If the local run queue is not empty (step 408: NO), then the priority of the thread at the head of the global run queue and the priority of the thread at the head of the local run queue are compared. If the priority of the thread at the head of the global run queue is higher than the priority of the thread at the head of the local run queue (step 412: YES), then the global run queue is selected for dispatch (step 410). If the priority of the thread at the head of the local run queue is higher than the priority of the thread at the head of the global run queue (step 412: NO), then the local run queue is selected for dispatch (step 414). Details of attempting to dispatch a thread from the local run queue are given in FIG. 5B below.

When both the global and local run queues have threads waiting that are of the same priority, the dispatcher usually selects, as a "tie breaker," the local run queue to dispatch a thread. This preference is used because a thread on the local run queue is serviced only by its assigned CPU(s). On the other hand, the global run queue may be serviced by any CPU assigned to the node. However, if choosing the local run queue would result in the two consecutive "tie breaks" in favor of the local run queue, the global run queue is chosen instead. The reason for this is to avoid starvation of the global run queue by repeatedly choosing the local run queue unconditionally.

Return now to the determination if the global run queue is empty in FIG. 4. If the global run queue is empty (step 404: YES), then a determination is made if the local run queue is empty. If the local run queue is not empty (step 416: NO), then the local run queue is selected for dispatch (step 414). If the local run queue is empty (step 416: YES), then idle load balancing is performed (step 418). Details of this operation appear in a flowchart given in FIG. 7.

With reference now to FIG. 5A, a flowchart outlines an exemplary operation of attempting to dispatch a thread from a global run queue. Dispatching a thread requires a lock on the queue, so a conditional lock is requested (step 502). If the lock is not obtained immediately (step 504: NO), then the global dispatch fails and a dispatch from the local run queue is attempted (step 506). If the lock on the global run queue is obtained, (step 504: YES), then a check is made if the queue is empty. This check is needed because the original check of the priority of the thread at the head of the queue (step 402 in FIG. 4) was made without a lock and it is possible the queue became empty before the time the current lock is obtained.

If the global run queue is empty (step 508: YES), then the global dispatch attempt fails and a dispatch from the local run queue is attempted (step 506). If the global run queue is not empty (step 508: NO), then the thread at the head of the queue is selected for dispatch (step 510). This dispatch occurs even if the thread at the head of the queue does not have the expected priority.

With reference now to FIG. 5B, a flowchart outlines an exemplary operation of attempting to dispatch a thread from a local run queue. A request is made for a lock on the local run queue (step 512). If the request is not successful (step 514: NO), then the request (step 512) is repeated. This is a spin on the lock and is allowed because the queue is the local run queue associated with the dispatching CPU. If the lock is obtained (step 514: YES), then it is determined if the queue is empty. This check is needed because the original check of the priority of the thread at the head of the local run queue (step 406 in FIG. 4) was made without a lock and it is possible the queue became empty before the time the current lock is obtained.

If the queue is empty (step 516: YES), then the dispatch fails and idle load balancing is performed (step 518). If the queue is not empty (step 516: NO), then the thread at the head of the local run queue is dispatched (step 520).

There is another circumstance when a "foreign" queue is examined, namely, when a CPU has no work available from either the global run queue or the local run queue, so it attempts to shift a job from the local run queue of another CPU in the same node. To understand this aspect of the invention, it is necessary to examine the criteria for selecting a candidate thread for shifting during idle load balancing.

Idle Load Balancing

Idle Load Balancing applies when a CPU would otherwise go idle and dispatcher 150 (FIG. 1) attempts to shift the workload from other CPUs at the same node onto the potentially idle CPU. The dispatcher searches for a local run queue that satisfies the following criteria:

1) the local run queue has the largest number of threads of all the local run queues of the node;
2) the local run queue contains more threads than the node's current shift threshold;
3) the local run queue contains at least one unbound thread; and
4) the local run queue has not had more threads shifted from it than a maximum shift threshold for the current clock cycle.

Details regarding these criteria can be found in an incorporate U.S. patent application Ser. No. 09/506,230. The critical difference between the prior art and the current invention is that examination of the local run queues according to the current invention is performed without placing locks on the local run queues.

As an example of the idle load balancing method, consider node 600 with CPUs 610, 620, 630, 640, 650, and 660 shown in FIG. 6. As shown in FIG. 6, CPU 620 is becoming idle since its associated local run queue 672 and global run queue 605 have no assigned threads. Thus, the idle CPU 620 attempts to shift a thread from another local run queue 671, 673–676.

Taking the above shift criteria into consideration, the local run queue satisfying the above criteria is local run queue 674. This is because local run queue 674 has the most threads, namely five, of all of the local run queues 671–676. The local run queue 674 contains at least one unbound thread (this is assumed) and the local run queue 674 has not reached its maximum number of shifted threads limit (this is also assumed). All of these criteria are determined without taking a lock on local run queue 674 or the other local run queues 671, 673, 675, and 676. Hence, the first unbound thread in local run queue 674 is shifted, assuming the locks for the run queue 674 and the thread are immediately available. If the locks are not available, CPU 620 is allowed to go idle.

FIG. 7 is a flowchart outlining an exemplary operation of dispatcher 150 (FIG. 1) when performing idle load balancing. Idle load balancing is initiated when a signal is received that a CPU is becoming idle (step 700). The local run queues of the node of the potentially idle CPU are scanned to find a local run queue meeting the above described idle load balancing criteria (step 710). This examination is done without taking locks on the local run queues that are examined. If a local run queue meeting the idle load balancing criteria is not found (step 720: NO), the CPU is allowed to go idle (step 725).

If a local run queue meeting the idle load balancing criteria is found (step 720: YES), a conditional lock on the local run queue is attempted. If a conditional lock cannot be obtained (step 730: NO), then the CPU goes idle (step 725). If a conditional lock is obtained (step 730: YES), then it is verified that the shift criteria are still valid. This step is needed since the contents of the selected local run queue may have changed between the time the queue is examined without a lock and the time the lock on the queue is obtained. If the shifting criteria are no longer satisfied (step 735: NO), then the CPU goes idle (step 725).

If the shifting criteria are still satisfied (step 735: YES), then an immediate lock is attempted on the thread to be shifted. If the thread lock is not obtained (step 740: NO), then the next unbound thread in the same queue is checked. If there are no more unbound threads (step 745: NO), then the CPU goes idle (step 725). If there is another unbound thread (step 745: YES), then an immediate lock on this thread is attempted (step 740). If the thread lock is obtained (step 740: YES), then the thread is shifted from the local run queue to the CPU that caused the idle load balancing to be invoked (step 750). If the thread lock is not obtained (step 740: NO), then the search continues for another unbound thread (step 745).

It is not desirable to spin on a lock in any foreign queue, as it is much better to try to find work locally. Allowing the CPU to go "idle" (step 725) is a bit of a misnomer since, during this time, the CPU runs the "idle task." This task loops looking for work to appear in any of the local run queues of the node, including its own. The idle task runs enabled for interrupts, so looping here is preferable to looping within the dispatcher, which runs with interrupts disabled. Allowing interrupts to be handled may result in the readying of more threads locally and, consequently, greater efficiency.

It is important in MP systems that the number of nodes in the system and the number of processors per node can be scaled up without encountering major bottlenecks. In the prior art, systems were difficult to scale up due to the bottleneck caused by lock contention on both global run queues and local run queues. By using the methods outlined in the present invention, these lock contentions are greatly reduced. The overall performance of the system is greatly enhanced by reducing the bottlenecks associated with such lock contention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An arbitration apparatus for arbitrating exclusive access contention in a multiple processor system having a plurality of processors, the multiple processor system having a plurality of local run queues and at least a first global run queue, wherein each of the plurality of processors has an associated local run queue that is one of the plurality of local run queues, the arbitration apparatus comprising:

determining means for determining a priority of a thread at a head of the first global run queue without obtaining exclusive access;

determining means for determining a priority of a thread at a head of a local run queue associated with a given processor without obtaining exclusive access;

comparing means for comparing the priority of the thread at the head of the first global run queue and the priority of the thread at the head of the local run queue associated with the given processor;

determining means for determining if the priority of the thread at the head of the first global run queue and the priority of the thread at the head of the local run queue associated with the given processor are the same;

selecting means for selecting a run queue for dispatch by the given processor from the plurality of processors, wherein the run queue is selected from the local run queue associated with the given processor, and the first global run queue run queue associated with the given processor in response to the priorities being different, as determined by comparing the run queues without obtaining exclusive access;

selecting means for selecting the local run queue associated with the given processor in response to the priorities being the same; and dispatching means for dispatching by the selected run queue.

2. The apparatus of claim 1, wherein the run queue selected for dispatch is the local run queue associated with the given processor, selected as a result of the thread at the head the local run queue associated with the given processor having higher priority than of the thread at the head of the first global run queue.

3. The apparatus of claim 1, wherein the run queue selected for dispatch is the first global run queue as a result of the thread at the head of the first global run queue having higher priority than the thread at the head of the local run queue associated with the given processor.

4. The apparatus of claim 1, wherein the run queue selected for dispatch is the local run queue associated with the given processor as a result of the first global run queue being empty and the local run queue associated with the given processor not being empty.

5. The apparatus of claim 1, wherein the run queue selected for dispatch is the first global run queue as a result of the local run queue associated with the given processor being empty and the first global run queue not being empty.

6. The apparatus of claim 1, wherein if an exclusive access request on the first global run queue for dispatching the thread in the first global run queue is not obtained immediately, then the exclusive access request is not repeated.

7. The apparatus of claim 1, wherein a thread for dispatch by the given processor from the plurality of processors, when the local run queue associated with the given processor, and the first global run queue associated with the given processor, are both empty, is selected from the local run queue associated with another processor from the plurality of processors, as determined by comparing the local run queues for all processors without obtaining exclusive access.

8. The apparatus of claim 7, wherein if an exclusive access request on the local run queue associated with the another processor, for dispatching a thread in the local run queue associated with the another processor is not obtained immediately, then the exclusive access request is not repeated.

9. The apparatus of claim 7, wherein if an exclusive access request on the thread selected for dispatch from the local run queue associated with the another processor is not obtained immediately, then the exclusive access request on the thread is not repeated.

10. The apparatus of claim 1, wherein, if the selecting means for selecting the local run queue associated with the given processor in response to the priorities being the same, results in the local run queue associated with the given processor being chosen twice consecutively, then the first global run queue associated with the given processor is selected.

11. A selection apparatus for selecting a run queue for dispatch in a multiple processor system having a plurality of processors, the selection apparatus comprising:

a local memory for each processor in the plurality of processors for storing a local run queue; and a global memory coupled to the plurality of processors for storing a global run queue, a shift threshold value, and a maximum shift threshold value, wherein each processor in the plurality of processors:
examines the global run queue without obtaining exclusive access;

determines a priority of a thread at a head of the global run queue;

examines its own local run queue without obtaining exclusive access;

determines a priority of a thread at a head of its own local run queue;

compares the priority of the thread at the head of the global run queue and the priority of the thread at the head of its own local run queue;

determines if the priority of the thread at the head of the global run queue and the priority of the thread at the head of the local run queue associated with the given processor are the same;

examines the local run queues of other processors in the plurality of processors without obtaining exclusive accesses if the global run queue and its own local run queue are empty;

selects a run queue from the global run queue and the local run queue for the plurality of processors for dispatch in response to the priorities being different;

selects the local run queue associated with the given processor in response to the priorities being the same;

requests an exclusive access on the selected run queue; and attempts to dispatch the thread from the selected run queue if the exclusive access is obtained.

12. The apparatus of claim 11, wherein if the thread at the head of the global run queue has a higher priority than the thread at the head of the local run queue associated with a given processor, then the global run queue is selected for dispatch.

13. The apparatus of claim 11, wherein if the thread at the head of the global run queue does not have higher priority than the thread at the head of the local run queue associated with a given processor, then the local run queue associated with the given processor is selected for dispatch.

14. The apparatus of claim 11, wherein if the local run queue associated with a given processor is empty and the global run queue is not empty, then the global run queue is selected for dispatch.

15. The apparatus of claim 11, wherein if the global run queue is empty and the local run queue associated with a given processor is not empty, then the local run queue associated with the given processor is selected for dispatch.

16. The apparatus of claim 11, wherein if an exclusive access request on the global run queue for dispatching the thread in the global run queue is not obtained immediately, then the exclusive access request is not repeated.

17. The apparatus of claim 11, wherein if the global run queue is empty and the local run queue associated with a given processor is empty, then the thread for dispatch by the given processor associated with the local run queue is selected from the local run queue associated with another processor from the plurality of processors, as determined by examining the local run queues for all processors in the plurality of processors without obtaining exclusive accesses.

18. The apparatus of claim 17, wherein the local run queue associated with the another processor, has a larger number of threads than all the local run queues associated with the plurality of processors.

19. The apparatus of claim 17, wherein the local run queue associated with the another processor, contains more threads than the shift threshold value associated with the plurality of processors.

20. The apparatus of claim 17, wherein the local run queue associated with the another processor, contains at least one thread that is not bound to a processor from the plurality of processors.

21. The apparatus of claim 17, wherein the local run queue associated with the another processor, has not had more threads shifted from the local run queue associated with the another processor for a current clock cycle than the maximum shift threshold value associated with the plurality of processors.

22. The apparatus of claim 17, wherein if an exclusive access request on the local run queue associated with the another processor, is not obtained immediately, then the exclusive access request is not repeated.

23. The apparatus of claim 17, wherein if an exclusive access request on the thread selected for dispatch from the local run queue associated with the another processor is not obtained immediately, then the exclusive access request on the thread is not repeated.

24. The apparatus of claim 11, wherein, if each processor in the plurality of processors selection of the local run queue associated with the given processor in response to the priorities being the same, results in the local run queue associated with the given processor being chosen twice consecutively, then the global run queue associated with the given processor is selected.

25. A computer program product stored in a tangible computer readable medium for arbitrating exclusive access contention in a multiple processor system having a plurality of processors, the multiple processor system having a plurality of local run queues and at least a first global run queue, wherein each of the plurality of processors has an associated local run queue that is one of the plurality of local run queues, the computer program product comprising:
  instructions for determining a priority of a thread at a head of the first global run queue without obtaining exclusive access;
  instructions for determining a priority of a thread at a head of a local run queue associated with a given processor without obtaining exclusive access;
  instructions for comparing the priority of the thread at the head of the first global run queue and the priority of the thread at the head of the local run queue associated with the given processor;
  instructions for determining if the priority of the thread at the head of the first global run queue and the priority of the thread at the head of the local run queue associated with the given processor are the same;
  instructions for selecting a run queue for dispatch by the given processor from the plurality of processors, wherein the run queue is selected from the local run queue associated with the given processor, and the first global run queue run queue associated with the given processor in response to the priorities being different, as determined by comparing the run queues without obtaining exclusive access;
  instructions for selecting the local run queue associated with the given processor in response to the priorities being the same; and
  instructions for dispatching by the selected run queue.

26. The computer program product of claim 25, wherein the selected run queue is the local run queue associated with the given processor as a result of the thread at the head of the local run queue associated with the given processor having higher priority than the thread at the head of the first global run queue.

27. The computer program product of claim 25, wherein the selected run queue is the global run queue as a result of the thread at the head of the first global run queue having higher priority than the thread at the head of the local run queue associated with the given processor.

28. The computer program product of claim 25, wherein the selected run queue is the local run queue associated with the given processor as a result of the first global run queue being empty and the local run queue associated with the given processor not being empty.

29. The computer program product of claim 25, wherein the selected run queue is the first global run queue as a result of the local run queue associated with the given processor being empty and the first global run queue not being empty.

30. The computer program product of claim 25, wherein if an exclusive access request on the first global run queue for dispatching the thread in the first global run queue is not obtained immediately, then the exclusive access request is not repeated.

31. The computer program product of claim 25, wherein a thread for dispatch by the given processor from the plurality of processors, when the local run queue associated with the given processor, and the first global run queue associated with the given processor, are both empty, is selected from the local run queue associated with another processor from the plurality of processors, as determined by comparing the local run queues for all processors without obtaining exclusive access.

32. The computer program product of claim 31, wherein if an exclusive access request on the local run queue associated with the another processor, for dispatching a thread in the local run queue associated with the another processor is not obtained immediately, then the exclusive access request is not repeated.

33. The computer program product of claim 31, wherein if an exclusive access request on the thread selected for dispatch from the local run queue associated with the another processor is not obtained immediately, then the exclusive access request on the thread is not repeated.

34. The computer program product of claim 25, wherein, if the instructions for selecting the local run queue associated with the given processor in response to the priorities being the same, results in the local run queue associated with the given processor being chosen twice consecutively, then the first global run queue associated with the given processor is selected.

* * * * *